US007716583B2

(12) United States Patent
Lim

(10) Patent No.: US 7,716,583 B2
(45) Date of Patent: May 11, 2010

(54) SHORTCUT FOR PREDETERMINED APPLICATION

(75) Inventor: Ruth Ann Lim, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1335 days.

(21) Appl. No.: 11/179,837

(22) Filed: Jul. 12, 2005

(65) Prior Publication Data

US 2007/0016860 A1    Jan. 18, 2007

(51) Int. Cl.
 *G06F 3/00* (2006.01)
(52) U.S. Cl. .................... 715/713; 715/779; 715/835; 715/839; 715/738
(58) Field of Classification Search ................ 715/713, 715/779, 835, 839, 738
See application file for complete search history.

(56) References Cited

U.S. PATENT DOCUMENTS

| | | | |
|---|---|---|---|
| 5,757,371 A * | 5/1998 | Oran et al. .................. 715/779 |
| 6,061,695 A | 5/2000 | Slivka et al. | |
| 6,072,486 A * | 6/2000 | Sheldon et al. ............. 715/835 |
| 6,639,615 B1 * | 10/2003 | Majumdar et al. .......... 715/839 |
| 6,819,340 B2 * | 11/2004 | Burke ........................ 715/738 |
| 6,832,237 B1 | 12/2004 | Christensen et al. | |
| 6,891,893 B2 | 5/2005 | Sullivan et al. | |
| 7,454,706 B1 * | 11/2008 | Matthews et al. ........... 715/713 |
| 2004/0041841 A1 * | 3/2004 | LeMogne et al. ........... 345/777 |
| 2004/0054721 A1 | 3/2004 | Pilu et al. | |
| 2005/0041743 A1 | 2/2005 | Sullivan et al. | |
| 2005/0246654 A1 * | 11/2005 | Hally et al. ................. 715/779 |

OTHER PUBLICATIONS

DISCover; DISCover Game Consoles; DISCover Game Consoles; Jun. 23, 2005; 1 pg.; www.discoverconsole.com; DISC, 444 W. Ocean Blvd, Long Beach, CA; US.
DISCover; DISCover Game Consoles; DISCover Delievers "My Games" in 2005; Jun. 24, 2005; 2 pgs.; www.discoverconsole.com/mygamespr.htm; 444 W. Ocean Blvd, Long Beach, CA; US.

* cited by examiner

*Primary Examiner*—Kieu Vu
*Assistant Examiner*—Michael Roswell

(57) ABSTRACT

There is read information on a system indicative of how to reach at least one pre-configured, pre-designated application in the system. The information is used to build at least one software button in at least one group of software buttons that allows launching of the pre-configured, pre-designated application.

18 Claims, 4 Drawing Sheets

SHORTCUT FOR PREDETERMINED APPLICATION

BACKGROUND

A product such as Windows XP Media Center Edition 2005 (™) (offered by Microsoft Corporation, One Microsoft Way, Redmond, Wash. 98052-6399, USA, http://www.microsoft.com) allows software vendors to write applications that can be installed to launch from a shortcut within Media Center. Media Center supports independent software vendor (ISV) software shortcuts to be installed under only a single subcategory called "More Programs." This makes difficult the navigation of the installed Media Center applications by shortcut because the shortcuts are grouped by title and by date.

Microsoft Corporation suggests that software vendors install their Media Center applications to launch within the "More Programs" area of the Media Center user interface. As one shortcoming, following the suggestion results in having large numbers of shortcuts under the "More Programs" area, which makes difficult searching for particular applications or features since one lacks exact identification of the choices for a particular class of features.

Some application vendors have links to other parts of their program on the user interface launched when the user clicks the "More Programs" shortcut. One design hard codes the shortcuts on the Media Center application page.

SUMMARY

The invention in one implementation encompasses a method. The method comprises the steps of: reading information on a system indicative of how to reach at least one pre-configured, pre-designated application in the system; and using the information to build at least one software button in at least one group of software buttons that allows launching of the pre-configured, pre-designated application.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, application vendors often install their Media Center applications to launch within the "More Programs" area of the Media Center user interface because Microsoft does not provide a built in approach for creating subfolders or directories for the shortcuts. For the navigation of the installed Media Center applications, it may be desirable to have additional subcategories for the grouping of shortcuts, for example, support tools or settings. The known Media Center shell environment does not provide "folders" or "subdirectories" for use by other environments to hierarchically organize program shortcuts. This may make it difficult for users to browse for a particular class of shortcuts. Since Media Center applications are implemented as Hyper Text Markup Language (HTML) pages, a link under "More Programs" could go to an HTML page served by a remote server that has links. One implementation of such an approach undesirably requires the client machine to be online, or to first perform a download of content.

It may be desirable to create a virtual subdirectory containing several Media Center applications to reduce the number of extraneous shortcuts that a user has to sort through to find a particular application. Media Center provides a limited category filter that would allow the user to limit the shortcuts presented on the More Programs user interface (UI) to those associated with a category. Unfortunately, Media Center only supports a small handful of pre-defined categories. If one wanted to group the applications into a category that Media Center does not recognize, one has to implement a virtual subdirectory or alternate filter process. Since Media Center does not provide the subdirectory structure natively, one approach is to write an HTML based Media Center application with which the user would interact as if it were a subdirectory. The application in one example would need to obtain the information typically used by the operating system or Media Center to create a shortcut. At its simplest, this information consists of: 1) how to launch or activate the program and 2) information related to visually representing the application as a choice, for example, icon, name of the shortcut, short text description, and/or the like.

It may be desirable to not only categorize the shortcuts on Media Center but also to flexibly create the shortcuts only if a target application was installed and to not show the shortcuts if the target application was not installed. It may also be desirable for the shortcuts to be created independently of one another. In addition, it may be desirable for each target application to be able to create a shortcut for the target application as the target application is installed.

Figure 1:
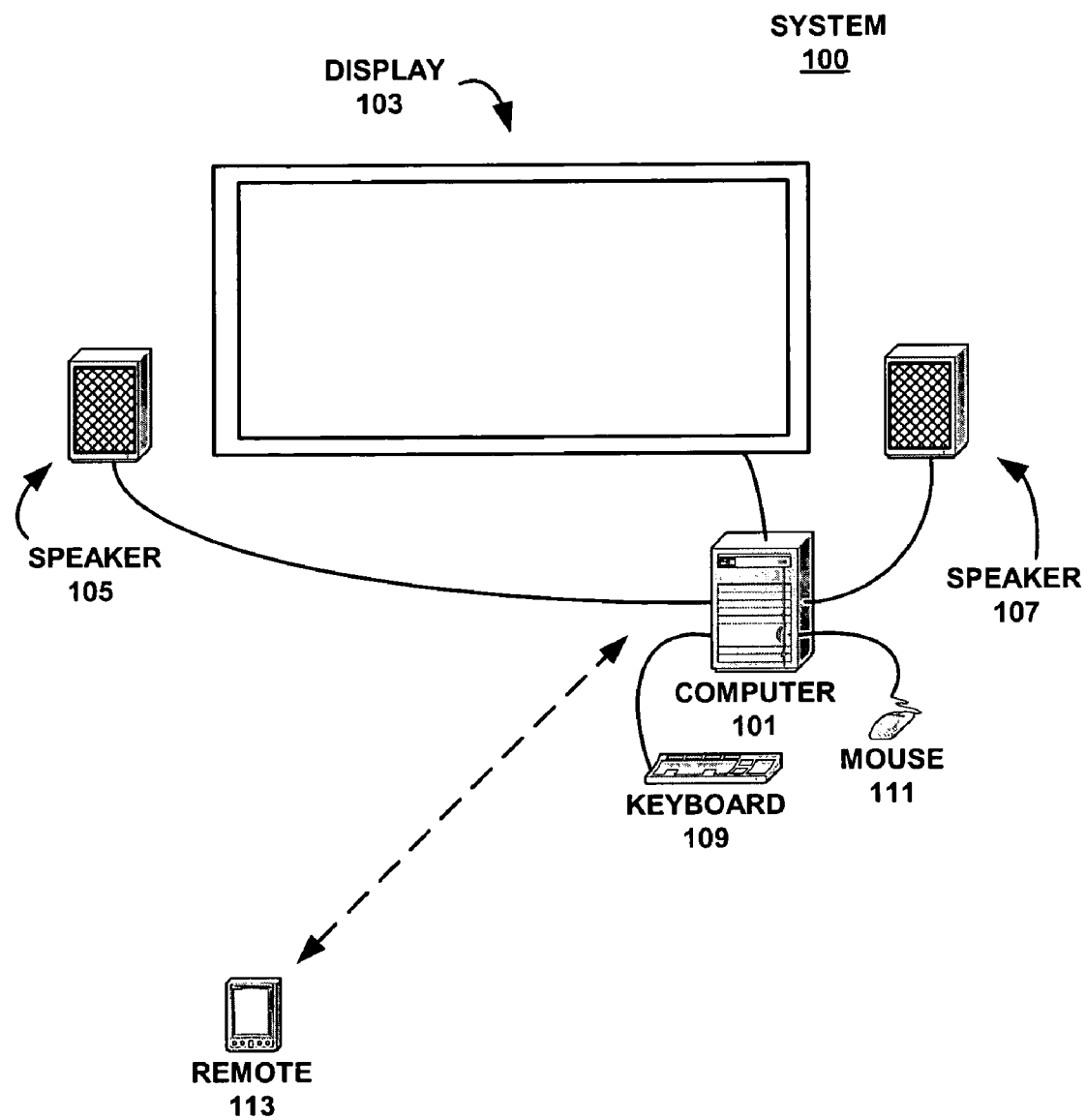
FIG. 1 is a representation of one implementation of an apparatus that comprises a system in which information is read on how to reach pre-configured, pre-designated applications on the system.

FIG. 1 is a representation of one implementation of an apparatus or system 100. Exemplary implementations may be used in a variety of systems. System 100 in one example comprises a computer 101 operatively coupled to a display 103. The computer 101 in one example comprises one or more processors, one or more memories, one or more operating systems (e.g., Windows XP Media Center Edition 2005 ™ offered by Microsoft Corporation, One Microsoft Way, Redmond, Wash. 98052-6399, USA, http://www.microsoft.com), one or more software programs, and/or the like. The display 103 may be, for example, a computer monitor, a high definition large screen display, and/or the like. The computer 101 may also be coupled to speakers 105, 107 a keyboard 109, and a mouse 111. A remote 113 may wirelessly control the computer 101.

Media Centers may have complete entertainment personal computers (PCs) in one example because they include: mid-to high-end processors; adequate memory for most computing and entertainment needs; high-capacity hard disks; CD-ROM/DVD drives; advanced graphics and audio capabilities; and networking connectivity.

For example, a Media Center may include the following: a Media Center compatible remote control that keeps all of the entertainment on the computer within easy reach and complements the keyboard and mouse; a remote infrared (IR) sensor that enables the remote control to communicate with the computer and also controls a cable or satellite set-top box; an advanced graphics card for displaying a desirable TV experience on the computer monitor; a TV tuner that captures the television signal from a cable, satellite, or antenna source; a hardware encoder that enables recording of TV shows from cable, satellite, or antenna to a hard disk for a computer; a TV output that allows Media Center content to be displayed on a television connected to the computer; and a digital audio output that integrates digital audio from the computer into an existing home entertainment system.

In one example, an object or control is embedded within a Dynamic Hyper Text Markup Language (DHTML) page implementing the Media Center application. The object in one example uses a command (COM) protocol or standard and executes when the DHTML page is loaded into the HTML control that is built into the Media Center. The object may have logic which examines the Windows registry (or other data structures including file system) on a host computer for information that allows it to construct shortcuts to pre-determined applications as the page loads. The information read from the data structure placed on the host system may include the name of the application, the location or path to the application executable, a short description of the application (e.g., analogous to a tool tip), an icon or image for the application, a shortcut title, and a subcategory of the shortcut. The object embedded in the DHTML based Media Center application uses this data to insert tags into a HTML page as the page loads.

The program logic, contained in a scripted part of the DHTML page, checks validity of the information read from the system (e.g., checks for file existence of the target application and image files for the icons). If the files are valid, the logic inserts tags that implement push buttons and active links that use the validated information as link destinations and icon source files. The data structure containing the shortcut information may be a persistent (disk based) storage. This allows the stored information to be updated once and then reused each time the present application runs. This also allows the present application to implement an organization mechanism for various independent applications missing from a shell of known Media Centers. The present application may contain logic that uses the shortcut information kept in the persistent data structure (e.g., Windows registry) to present the desired shortcuts in an organized fashion.

One implementation may organize the shortcuts according to a substructure by recording the necessary organization information along with the shortcut in the persistent storage. The shortcuts may be arranged in defined categories, and additional categories may be defined over time. This may be accomplished by adding appropriate fields to the data structure to specify the subcategories and the relationships between categories. The persistent structure (for example, the Windows registry) contains information that organizes the shortcuts.

The information about the shortcuts is read each time the DHTML page loads and creates the links to the applications. This allows the setup program for a new application to update the data structure (e.g., the Windows registry) on the system with its shortcut information. If the setup program for a new application does not place the files where it specifies they may be found, then the DHTML application comprises sufficient intelligence to not create the new shortcut on its own user interface. However, if the setup program for the new application installs the files in a way that matches the information it provides to create a shortcut to itself, then the DHTML application will create and present the specified shortcut to the user. This has the advantage over hard-coding the shortcut destinations in that the application does not risk showing the user a malformed or broken shortcut. Furthermore, since validity of a shortcut may be checked prior to creating the user interface representing the shortcut, the user interface only shows valid links.

Figure 2:
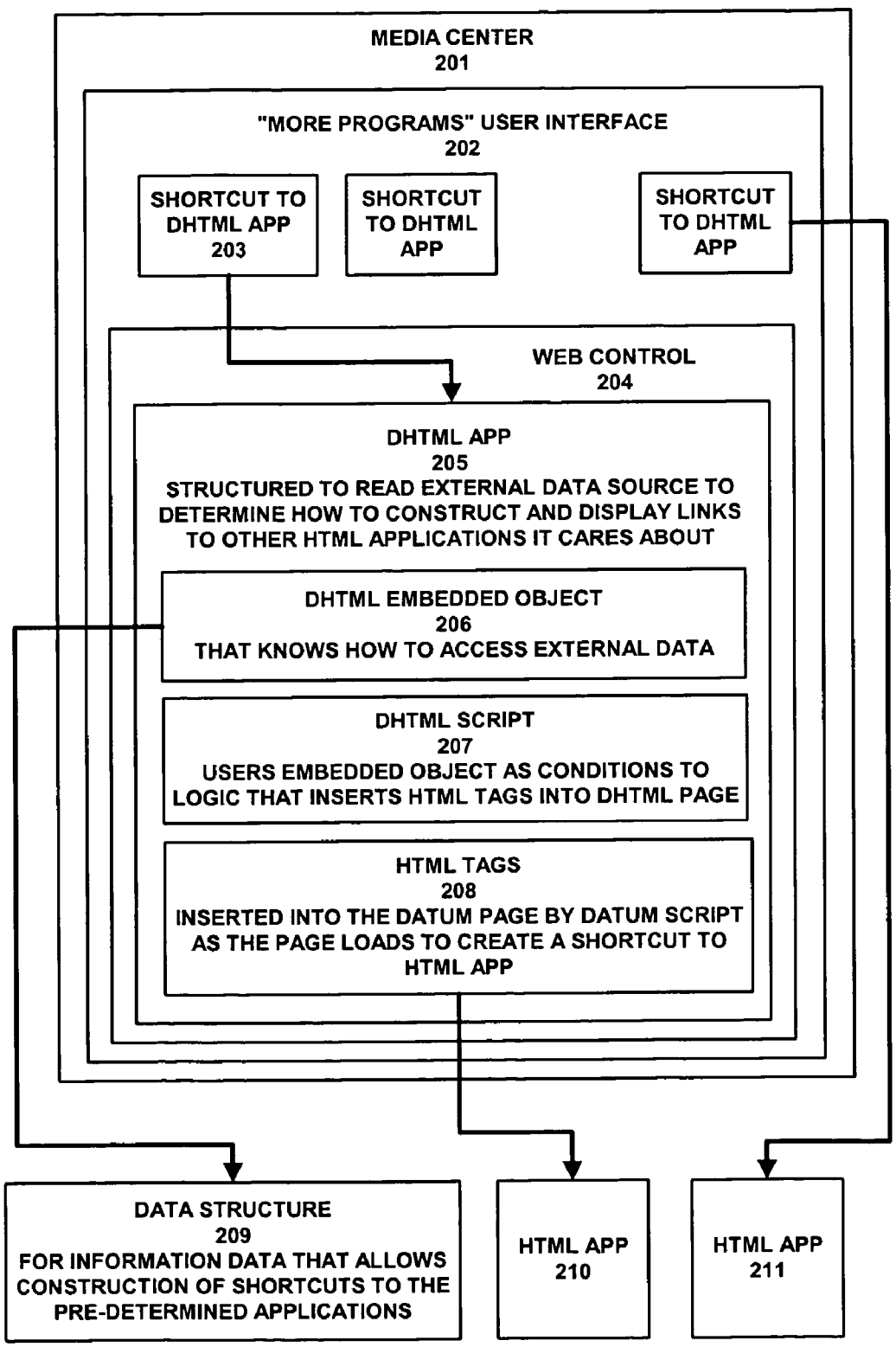
FIG. 2 is a more detailed representation of a portion of the apparatus of FIG. 1.

FIG. 2 is a more detailed representation of a portion of the system 100. In one implementation of the system 100, DHTML page 205 serves to implement a Media Center application in a Media Center having predetermined applications. The DHTML page 205 in one example is displayed on display 103 and executed by a processor of the computer 101 cooperating with memory of the computer 101. DHTML page 205 is hosted within a web control 204 inside of Media Center 201.

An object 206 may be embedded within the DHTML page 205 such that the script 207 components within the DHTML page 205 use the functions provided by the object 206 to insert HTML tags 208 into the body of the DHTML page 207 as the page loads in the Media Center web control 204. The Media Center 201 runs on the computer 101 and serves to host the DHTML page 205 in a web control. The Media Center 201 in one example acts: as a pseudo Windows shell by providing a user environment targeted for distance viewing and input via a remote control; and as a limited web browser. A data structure 209 for information data allows construction of shortcuts 208 to the pre-determined applications 210. The data structure 209 in one example is located on the computer 101 (or even on the network assuming that the computer 101 can access the data structure) and accessed by the embedded object 206. The nature of the data structure in one example depends on the type of data structures supported by the design of the embedded object. An exemplary object should select a data structure that stores the data in non-volatile memory and can be shared with other applications, for example, the install programs for the target applications. An exemplary implementation ensures that proper security measures are taken to authenticate the data used to create a link on the DHTML page 205 via HTML tags 208 inserted into the DHTML page. One exemplary implementation could use XML files or a .ini file or some other external source of data such as the Windows registry. The object 206 or DHTML script 207 may have logic to pre-define a set of recognized shortcuts or the logic could be written to support an arbitrary set of shortcuts, assuming that an appropriate protocol were established to allow the logic to know how many shortcuts it should try to construct. Tags 208 in the DHTML page 205 may be inserted as the DHTML page 205 loads; the object 206 embedded in the DHTML based Media Center application uses the information data 209 to insert the tags 208 into the DHTML page 205. The tags implement push buttons and active links that use the information data as link destinations and icon source files. The DHTML page 205 may be structured such that the groups the shortcuts into DHTML pages that simulate subfolders or directories for the predetermined applications. The DHTML page 205 may be referred to as a media center application shortcut aggregation page.

Figure 3:
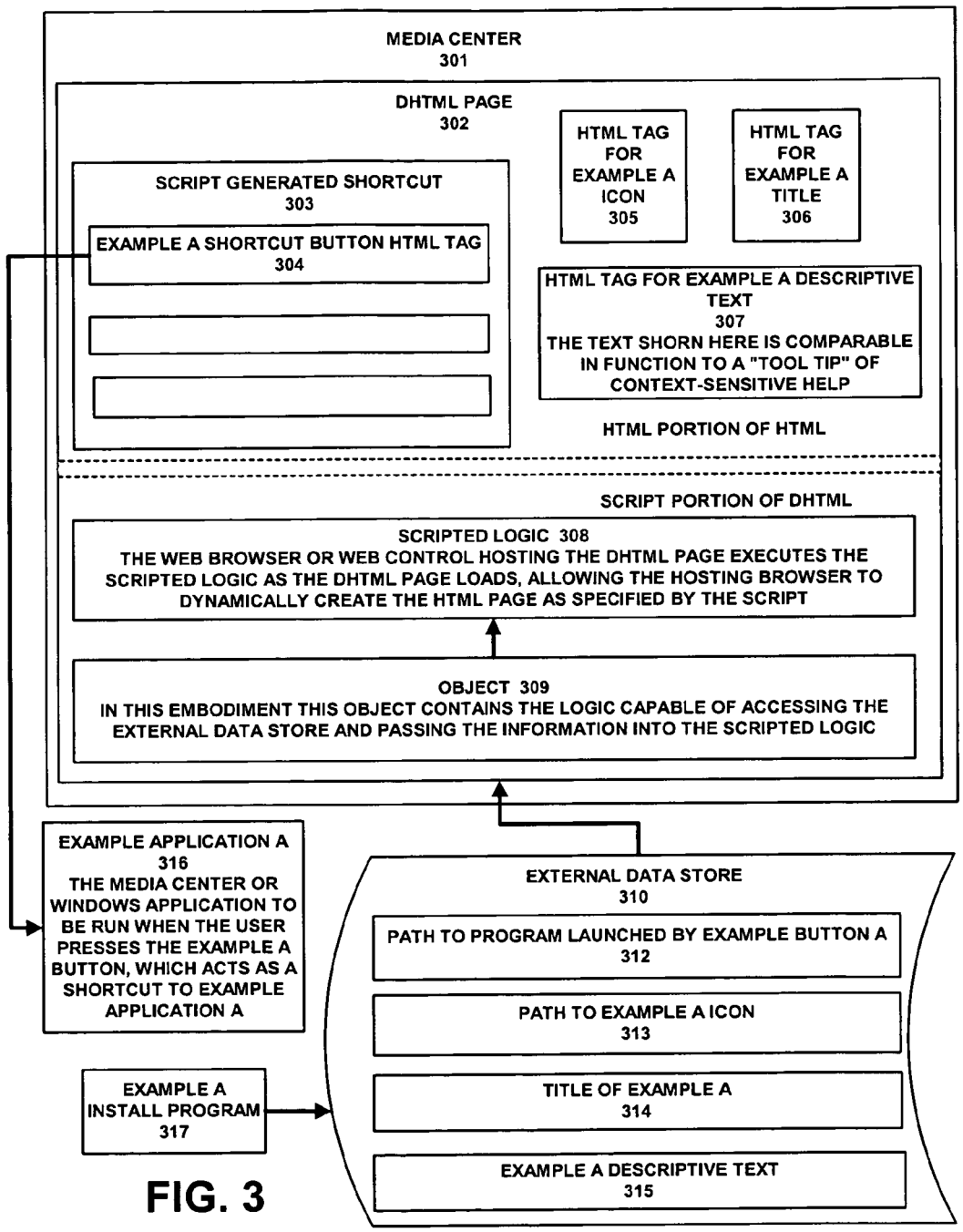
FIG. 3 is a representation of one exemplary logic flow for use in the apparatus of FIG. 1.

FIG. 3 shows an example that embodies the approach outlined in this document. In FIG. 3, Media Center 301 hosts a DHTML page 302 that consists of an HTML portion and a scripted portion. The scripted portion in turn consists of scripted logic 308 and an object 309, such as a COM object or ActiveX control. Object 309 is written such that it can access an external data store 310, such as an XML file, database file, .ini file, Windows registry. External data store 310 in one example is a shared data store accessible to applications independent of DHTML page 302 through a well-defined protocol (such as name/value pairs of data fields) that can be added to the data store by the installation program 317 for the application to launch, here example A 316. The apparatus 100 may read information on a system indicative of how to reach at least one pre-configured, pre-designated application in the system 301. The goal is to generate HTML on the DHTML page 302 that will show the user a set of shortcuts to applications, embodied as a shortcut button 304 to example application A 316. The point is to create a page with a list of such shortcuts that allow the user to launch the applications listed on the page from the page via the buttons 304. The apparatus 100 may use the information to build at least one software button in at least one group of software buttons that allows launching of the application 302. For example, items 312-315 demonstrate the type of information required to create a shortcut, namely the fully qualified command to launch the application, a fully qualified path name to the icon file used to represent the application, the "title" or name used to help identify the shortcut as pointing to a particular application, and a textual description of the application. To adequately provide enough information for the DHTML script logic 308 to dynamically create a shortcut in one example, the object 309 is able to extract this information from the external data store 310. That is, the data store contains information pertaining to shortcut creation 312-315, and the object 309 calls that access the data store 310 is able to return the values 312-315 to the script logic 308 part of the DHTML 302.

The system may have a plurality of pre-configured, pre-designated applications. A plurality of software buttons may be built such that the plurality of software buttons respectively allow launching of the plurality of applications. The software buttons may be representative of shortcuts, and the method may further comprise organizing the shortcuts into defined groups. Also, the present method may further comprise defining new groups over time.

Figure 4:
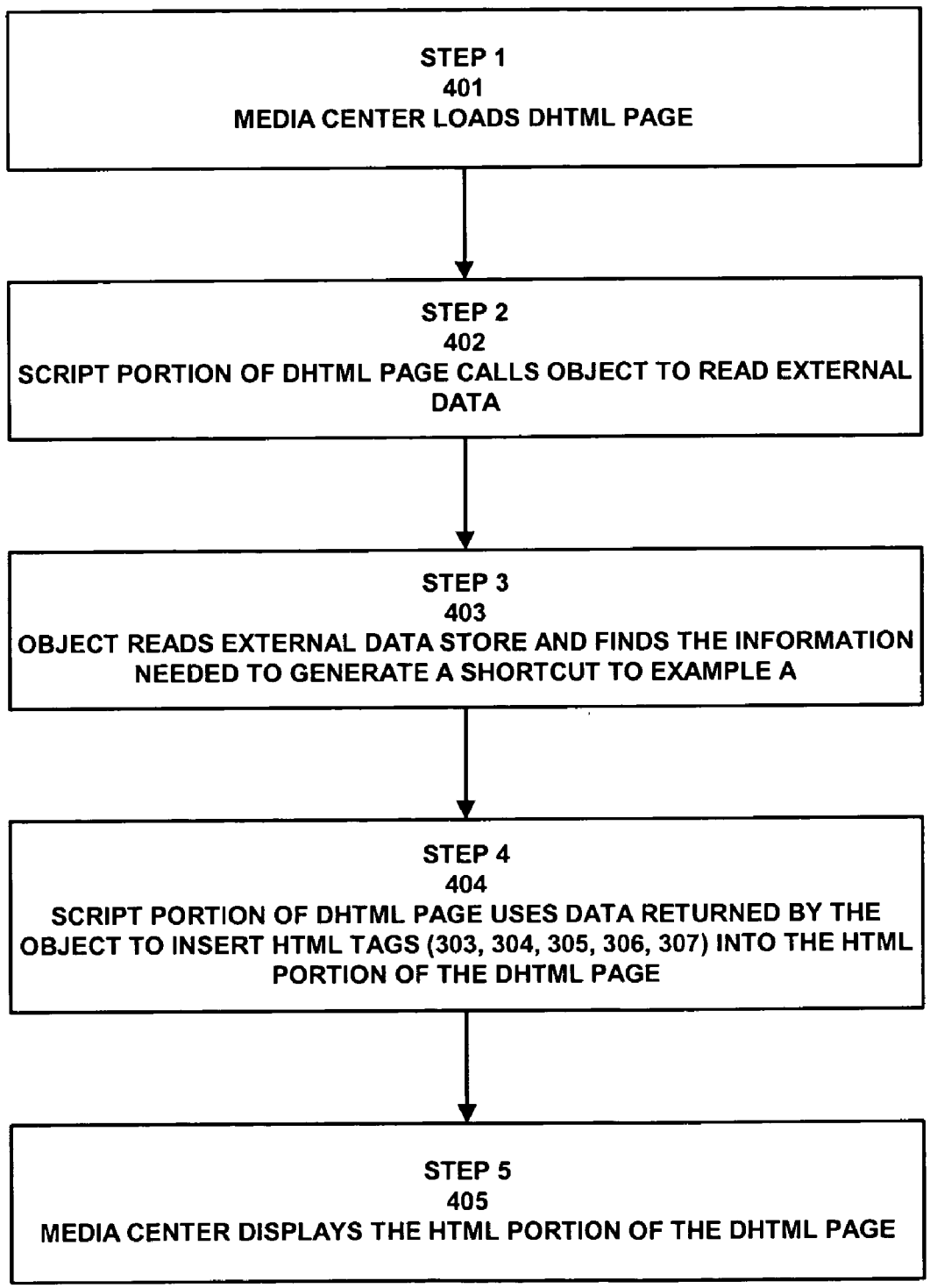
FIG. 4 is a representation of another exemplary logic flow for use in the apparatus of FIG. 1.

FIG. 4 is a representation of another exemplary process flow, including an exemplary order in which the various parts of the DHTML are exercised to create the shortcut from the data store. The apparatus 100 may read information on a computer having a Windows XP Media Center, the information being indicative of how to reach at least one pre-configured, pre-designated application in the system 401. The apparatus 100 may use the information to build at least one software button in at least one group of software buttons that allows launching of the application 402.

FIG. 4. shows an abstract representation of the overall logic expected when a Media Center DHTML uses the ideas contained in this disclosure. First, a Media Center DHTML application acquires logical control and executes when Media Center loads the DHTML in Step 1 401. The DHTML should use the opportunity to execute the code required to access the external data store 310. Presumably, the DHTML script logic 308 would use the object 309 to access the data store 310 in this step 2 402. The object 309 executes its own code once it acquires control from the script logic 308; this logic accesses the external data store 310 in such a way that the object 309 gives the script logic 308 the data values 312-315 read from the external data store 310. This is step 3 403. Once the object 309 returns the data values 312-315 to the DHTML script logic 308, control passes back to the script logic 308. However, since the script logic 308 has received data values defining how to construct a link or shortcut, the DHTML script logic 308 now can create the HTML tags implementing the user interface associated with the link. The creation step is step 4 404. Once the DHTML script logic has finished generating the HTML tags 404, it returns control back over to Media Center, which then loads the HTML 405.

The apparatus 100 in one example may comprise a plurality of components such as one or more of electronic components, hardware components, and computer software components. A number of such components can be combined or divided.

The apparatus 100 in one example may employ one or more computer-readable signal-bearing media. The computer-readable signal-bearing media store software, firmware and/or assembly language for performing one or more portions of one or more implementations of the invention. The computer-readable signal-bearing medium for the apparatus 100 in one example may comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

An exemplary implementation reads the shortcut information from a persistent storage that may be updated by other setup applications, and allows the present application to create shortcuts to applications that are not known at the time the present application is itself installed.

In view of a problem posed by the Media Center shell, an exemplary implementation may organize shortcuts into arbitrary, predefined categories.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a processor;
   a computer-readable storage medium to store:
      a DHTML page for implementing a Media Center application in a Media Center having predetermined applications;
      an object embedded within the DHTML page, the object executed by the processor when the DHTML page is loaded into an HTML control built into the Media Center, the HTML control providing an HTML page;
      a data structure for information data that allows construction of shortcuts to the predetermined applications;
   wherein the object has logic structured such that the data structure for the information data that allows construction of shortcuts to the predetermined applications is examined as the DHTML page is loaded by the processor, such that construction of the shortcuts is initiated via the DHTML page being loaded by the processor;
   wherein tags in the HTML page are inserted as the DHTML page is loaded by the processor, the object embedded in the DHTML page using the information data to insert the tags into the HTML page, the tags corresponding to the shortcuts to the predetermined applications; and
   wherein the HTML page is structured such that the Media Center provides shortcuts in subfolders or directories for the predetermined applications.

2. The apparatus of claim 1, wherein the data structure comprises at least a name of a respective predetermined application, a location or path to an application executable for the respective predetermined application, a short description of the respective predetermined application, an icon or image for the respective predetermined application, a shortcut title, and a subcategory of the shortcut.

3. The apparatus of claim 1, wherein the tags implement push buttons and active links that use the information data as link destinations and icon source files.

4. The apparatus of claim 3, wherein the data structure further comprises substructure information that defines the shortcuts being organized according to a predetermined substructure.

5. The apparatus of claim 1, wherein the data structure containing the information data comprises a persistent storage that allows the information data to be updated once and then reused each time the application runs.

6. The apparatus of claim 5, wherein the information data is representative of shortcuts, and wherein the persistent storage further contains substructure information that defines the shortcuts being organized according to a predetermined substructure.

7. A method comprising:
providing a DHTML page for implementing a Media Center application in a Media Center having predetermined applications;
embedding an object embedded within the DHTML page, the object executed by a processor when the DHTML page is loaded into an HTML control built into the Media Center, the HTML control providing an HTML page;
providing a data structure for information data that allows construction of shortcuts to the predetermined applications;
examining the data structure for the information data that allows construction of shortcuts to the predetermined applications, by a processor executing logic of the object, as the DHTML page is loaded by the processor, such that construction of the shortcuts is initiated via the DHTML page being loaded by the processor; and,
inserting tags in the HTML page, by the processor executing the object embedded in the DHTML page and using the information data as directed by the object, as the DHTML page is loaded by the processor, the tags corresponding to the shortcuts to the predetermined applications,
wherein the HTML page is structured such that the Media Center provides shortcuts in subfolders or directories for the predetermined applications.

8. The method of claim 7, wherein the data structure comprises at least a name of a respective predetermined application, a location or path to an application executable for the respective predetermined application, a short description of the respective predetermined application, an icon or image for the respective predetermined application, a shortcut title, and a subcategory of the shortcut.

9. The method of claim 7, wherein the tags implement push buttons and active links that use the information data as link destinations and icon source files.

10. The method of claim 9, wherein the data structure further comprises substructure information that defines the shortcuts being organized according to a predetermined substructure.

11. The method of claim 7, wherein the data structure containing the information data comprises a persistent storage that allows the information data to be updated once and then reused each time the application runs.

12. The method of claim 11, wherein the information data is representative of shortcuts, and wherein the persistent storage further contains substructure information that defines the shortcuts being organized according to a predetermined substructure.

13. A computer-readable storage medium storing computer code, wherein execution of the computer code by a processor causes a method to be performed, the method comprising:
providing a DHTML page for implementing a Media Center application in a Media Center having predetermined applications;
embedding an object embedded within the DHTML page, the object executed by a processor when the DHTML page is loaded into an HTML control built into the Media Center, the HTML control providing an HTML page;
providing a data structure for information data that allows construction of shortcuts to the predetermined applications;
examining the data structure for the information data that allows construction of shortcuts to the predetermined applications, by a processor executing logic of the object, as the DHTML page is loaded by the processor, such that construction of the shortcuts is initiated via the DHTML page being loaded by the processor; and,
inserting tags in the HTML page, by the processor executing the object embedded in the DHTML page and using the information data as directed by the object, as the DHTML page is loaded by the processor, the tags corresponding to the shortcuts to the predetermined applications
wherein the HTML page is structured such that the Media Center provides shortcuts in subfolders or directories for the predetermined applications.

14. The computer-readable storage medium of claim 13, wherein the data structure comprises at least a name of a respective predetermined application, a location or path to an application executable for the respective predetermined application, a short description of the respective predetermined application, an icon or image for the respective predetermined application, a shortcut title, and a subcategory of the shortcut.

15. The computer-readable storage medium of claim 13, wherein the tags implement push buttons and active links that use the information data as link destinations and icon source files.

16. The computer-readable storage medium of claim 15, wherein the data structure further comprises substructure information that defines the shortcuts being organized according to a predetermined substructure.

17. The computer-readable storage medium of claim 13, wherein the data structure containing the information data comprises a persistent storage that allows the information data to be updated once and then reused each time the application runs.

18. The computer-readable storage medium of claim 17, wherein the information data is representative of shortcuts, and wherein the persistent storage further contains substructure information that defines the shortcuts being organized according to a predetermined substructure.

* * * * *